United States Patent
Schipper et al.

(10) Patent No.: US 10,094,930 B2
(45) Date of Patent: Oct. 9, 2018

(54) GLOBAL NAVIGATION SATELLITE SYSTEM (GNSS) SPOOFING DETECTION WITH CARRIER PHASE AND INERTIAL SENSORS

(71) Applicant: Honeywell International Inc., Morristown, NJ (US)

(72) Inventors: Brian W. Schipper, Brooklyn Park, MN (US); Kevin Sweeney, Minneapolis, MN (US); Wesley J. Hawkinson, Chanhassen, MN (US)

(73) Assignee: Honeywell International Inc., Morris Plains, NJ (US)

( * ) Notice: Subject to any disclaimer, the term of this patent is extended or adjusted under 35 U.S.C. 154(b) by 371 days.

(21) Appl. No.: 14/747,547

(22) Filed: Jun. 23, 2015

(65) Prior Publication Data
US 2016/0377726 A1 Dec. 29, 2016

(51) Int. Cl.
*G01S 19/21* (2010.01)
*G01S 19/29* (2010.01)
(Continued)

(52) U.S. Cl.
CPC .......... *G01S 19/215* (2013.01); *G01S 19/246* (2013.01); *G01S 19/29* (2013.01)

(58) Field of Classification Search
CPC ........ G01S 19/215; G01S 19/29; G01S 19/47; G01S 19/26; G01S 19/246; G01C 21/165; H01Q 25/00
See application file for complete search history.

(56) References Cited

U.S. PATENT DOCUMENTS 5,543,804 A * 8/1996 Buchler et al. ......... G01S 19/47
5,657,025 A * 8/1997 Ebner et al. ......... G01C 21/165
(Continued)

FOREIGN PATENT DOCUMENTS

CN 103713297 4/2014
EP 2348335 7/2011

OTHER PUBLICATIONS

Entry for the word, "Module" in Webopedia.com; retrieved on Aug. 23, 2017.*
(Continued)

*Primary Examiner* — Bernarr E Gregory
(74) *Attorney, Agent, or Firm* — Fogg & Powers LLC

(57) ABSTRACT

A system to detect spoofing attacks is provided. The system includes a satellite-motion-and-receiver-clock-correction module, a compute-predicted-range-and-delta-range module, a subtractor, and delta-range-difference-detection logic. The satellite-motion-and-receiver-clock-correction module periodically inputs, from a global navigation satellite system (GNSS) receiver, a carrier phase range for a plurality of satellites. The satellite-motion-and-receiver-clock-correction module outputs a corrected-delta-carrier-phase range for a current epoch to a first input of a subtractor. The compute-predicted-range-and-delta-range module outputs a predicted delta range to a second input of the subtractor. The predicted delta range is based on inertial measurements observed for the current epoch. The subtractor outputs a difference between the corrected-delta-carrier-phase range and the predicted delta range for the current epoch to delta-range-difference-detection logic. The delta-range-difference-detection logic determines if the difference exceeds a selected-range threshold. If the difference exceeds the selected-range threshold, the delta-range-difference-detec-
(Continued)

tion logic determines the GNSS receiver was spoofed in the current epoch.

13 Claims, 9 Drawing Sheets

(51) Int. Cl.
*G01S 19/24* (2010.01)
*G01S 19/00* (2010.01)

(56) References Cited

U.S. PATENT DOCUMENTS

| | | | |
|---|---|---|---|
| 6,240,367 B1* | 5/2001 | Lin | G01S 19/26 |
| 6,278,945 B1* | 8/2001 | Lin | G01C 21/165 |
| 6,417,802 B1* | 7/2002 | Diesel | G01S 19/26 |
| 6,424,914 B1* | 7/2002 | Lin | G01C 21/165 |
| 6,720,913 B1 | 4/2004 | Schipper | |
| 8,560,218 B1 | 10/2013 | Kahn et al. | |
| 8,922,427 B2 | 12/2014 | Dehnie et al. | |
| 2001/0020216 A1 | 9/2001 | Lin | G01C 21/165 |
| 2002/0111717 A1* | 8/2002 | Scherzinger et al. | G01C 21/165 |
| 2002/0171586 A1* | 11/2002 | Martorana et al. | H01Q 25/00 |
| 2003/0149528 A1* | 8/2003 | Lin | G01C 21/165 |
| 2006/0161329 A1* | 7/2006 | Crane et al. | G01S 19/26 |
| 2007/0194984 A1 | 8/2007 | Waid | |
| 2010/0117899 A1 | 5/2010 | Papadimitratos et al. | |
| 2011/0102259 A1 | 5/2011 | Ledvina et al. | |
| 2013/0157605 A1* | 6/2013 | Dickman et al. | G01S 19/215 455/296 |
| 2014/0074397 A1 | 3/2014 | Vanderwerf | |
| 2014/0375497 A1 | 12/2014 | Friend et al. | |
| 2015/0084812 A1 | 3/2015 | Sernik | |
| 2015/0234053 A1* | 8/2015 | Psiaki | G01S 19/215 342/357.51 |

OTHER PUBLICATIONS

European Patent Office, "Extended European Search Report from EP Applicaiton No. 16173204.5, dated Nov. 28, 2016", "from Foreign Counterpart of U.S. Appl. No. 14/747,547", filed Nov. 28, 2016, pp. 1-11.
Dovis, Fabio, "GNSS Interference, Threats, and Countermeasures", Jan. 2015, p. 189, Publisher: Artech House Publishers.
Kwon et al., "Spoofing Signal Detection Using Accelerometers in IMU and GPS Information", "The Transactions of the Korean Institute of Electrical Engineers", 2014, pp. 1273-1280, vol. 63, No. 9.
Swaszek et al., "GNSS Spoof Detection Using Shipboard IMU Measurements", "Proceedings of the 27th International Technical Meeting of the Satellite Division of the Institute of Navigation", Sep. 2014, pp. 745-758, Publisher: ION: The Institute of Navigation, Published in: Tampa, Florida.
European Patent Office; Communication pursuant to Article 94(3) EPC from EP Application No. 16173204.5 dated Apr. 26, 2018; from Foreign Counterpart of U.S. Appl. No. 14/747,547, filed Apr. 4, 2018; pp. 1-5.

* cited by examiner

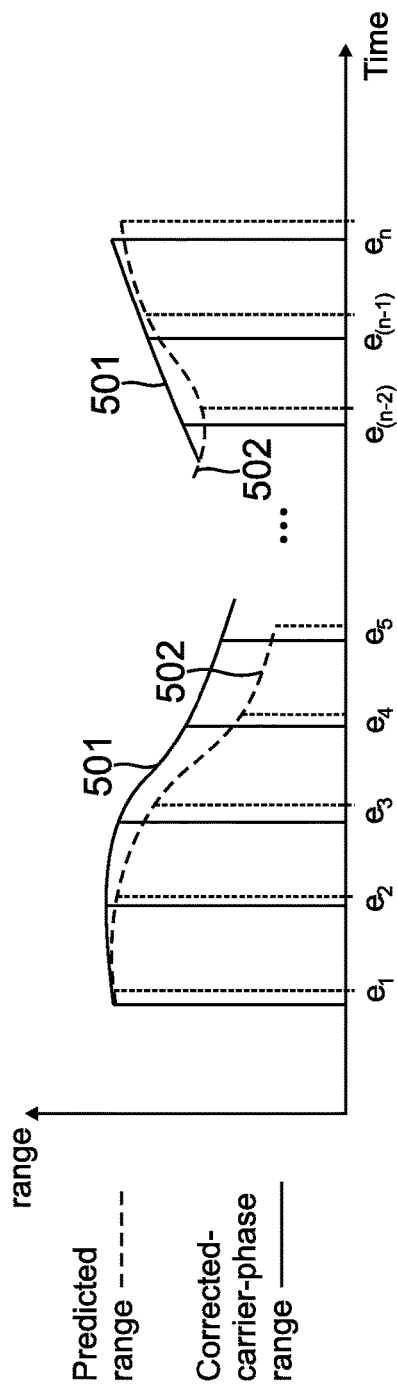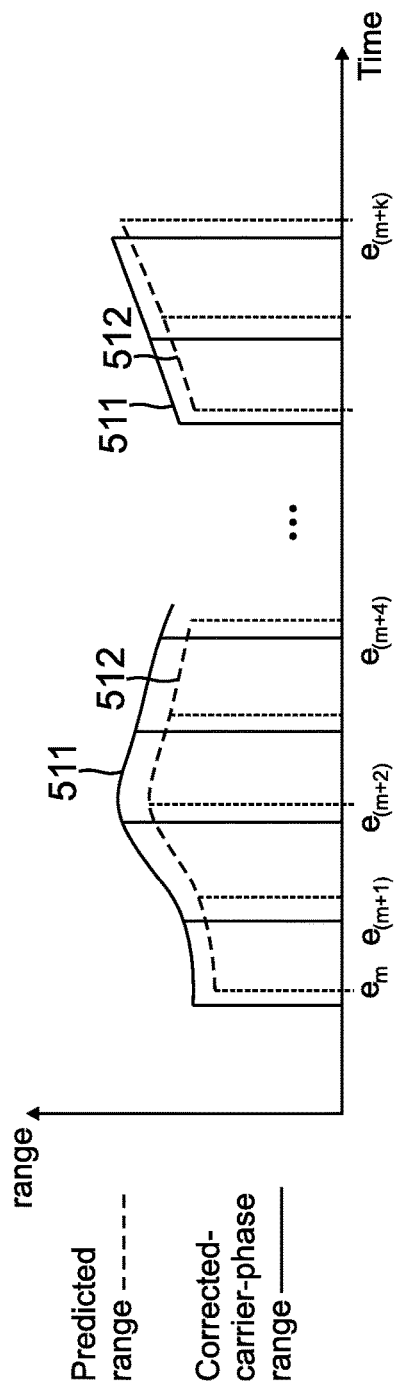

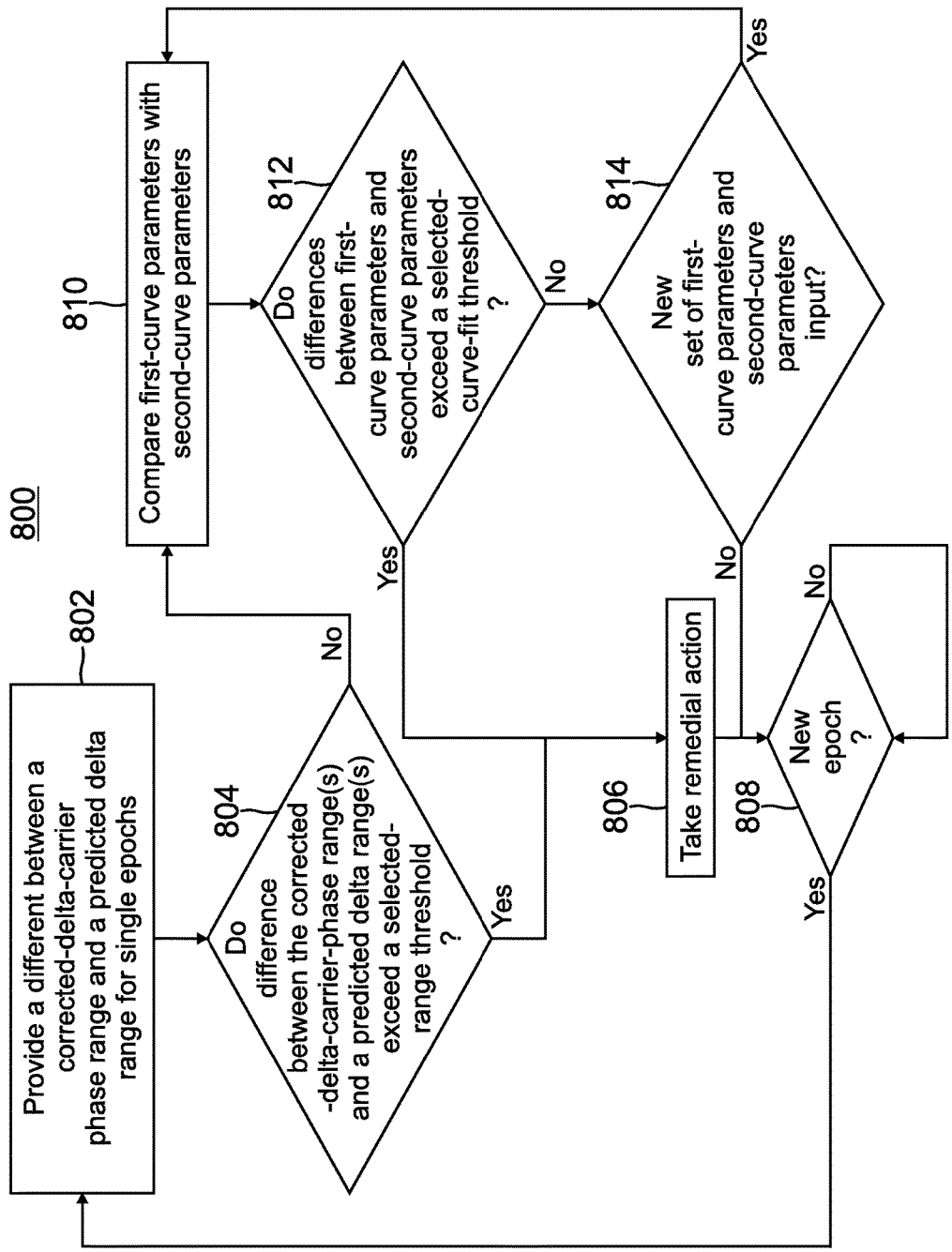

GLOBAL NAVIGATION SATELLITE SYSTEM (GNSS) SPOOFING DETECTION WITH CARRIER PHASE AND INERTIAL SENSORS

BACKGROUND

A Global Navigation Satellite System (GNSS) is a satellite system that is used to pinpoint the geographic location of a GNSS receiver. Spoofing of a GNSS system is typically used to cause erroneous navigation data to be output from a navigation system in a vehicle that is using the GNSS satellite system. FIG. 2A shows an exemplary GNSS spoofing attack on an unprotected vehicle 51. As shown in FIG. 2A, the spoofing system includes an antenna 306 that inputs satellite signals via wireless data links 321, 322, and 323 from the plurality of respective satellites 351, 352, and 353 that are in view of the vehicle 51. The satellite signals received at the antenna 306 are modified by the spoofer-electronics-and-logic 305. The spoofing system also includes antenna 307 that emits a modified satellite signals via wireless data link 315 to the navigation system on the vehicle 51. The modified satellite signals received via data link 315 at the GNSS receiver of the unprotected vehicle 51 is stronger in amplitude than the true, unmodified satellite signals received at GNSS receiver 110 via wireless data link 311, 312, and 313 from the respective antennas 351, 352, and 353. In this manner, the spoofer-electronics-and-logic 305 provides false data to the vehicle 51 so the navigation system in the vehicle 51 indicates the vehicle 51 is at a location that is different from the actual location of the vehicle 51.

The aviation industry and the marine industry desire anti-spoofing capability to protect high-value assets (e.g., aircraft and water-based vehicles) from a spoofing attack. Currently available techniques to detect a spoofing attack require multiple antennas on the vehicle that may also be articulated and move. This is not a desirable solution since it adds significant cost to a GNSS installation.

Some of the currently available anti-spoofing techniques identify outlier GNSS data, which is excluded from the data used to generate a navigation solution. The outlier data can be a vestigial signal from a code or carrier Doppler shift frequency.

In other currently available techniques, inertial sensors provide acceleration measurements for a GNSS enabled device. A location of the GNSS enabled device is approximated based on a known location and the acceleration measurements. The approximate location is compared with the received positioning data to determine whether the received positioning data is within a confidence interval of the prediction.

SUMMARY

The present application relates to a system to detect spoofing attacks. The system includes a satellite-motion-and-receiver-clock-correction module, a compute-predicted-range-and-delta-range module, a subtractor, and delta-range-difference-detection logic. The satellite-motion-and-receiver-clock-correction module is communicatively coupled to periodically input, from a global navigation satellite system (GNSS) receiver, a carrier phase range for a plurality of satellites in view of the GNSS receiver. The satellite-motion-and-receiver-clock-correction module is communicatively coupled to output a corrected-delta-carrier-phase range for a current epoch to a first input of a subtractor. The compute-predicted-range-and-delta-range module is communicatively coupled to output a predicted delta range to a second input of the subtractor. The predicted delta range is based on inertial measurements observed for the current epoch. The subtractor outputs a difference between the corrected-delta-carrier-phase range and the predicted delta range for the current epoch to delta-range-difference-detection logic. The delta-range-difference-detection logic determines if the difference exceeds a selected-range threshold. If the difference exceeds the selected-range threshold, the delta-range-difference-detection logic determines the GNSS receiver was spoofed in the current epoch.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 5A illustrates an exemplary first curve and second curve generated for a first plurality of epochs by the system of FIG. 4;

FIG. 5B illustrates an exemplary first curve and second curve generated for a second plurality of epochs by the system of FIG. 4;

FIG. 8 illustrates an embodiment of a method to detect GNSS spoofing using the system of FIG. 7 in accordance with the present application.

Figure 1:
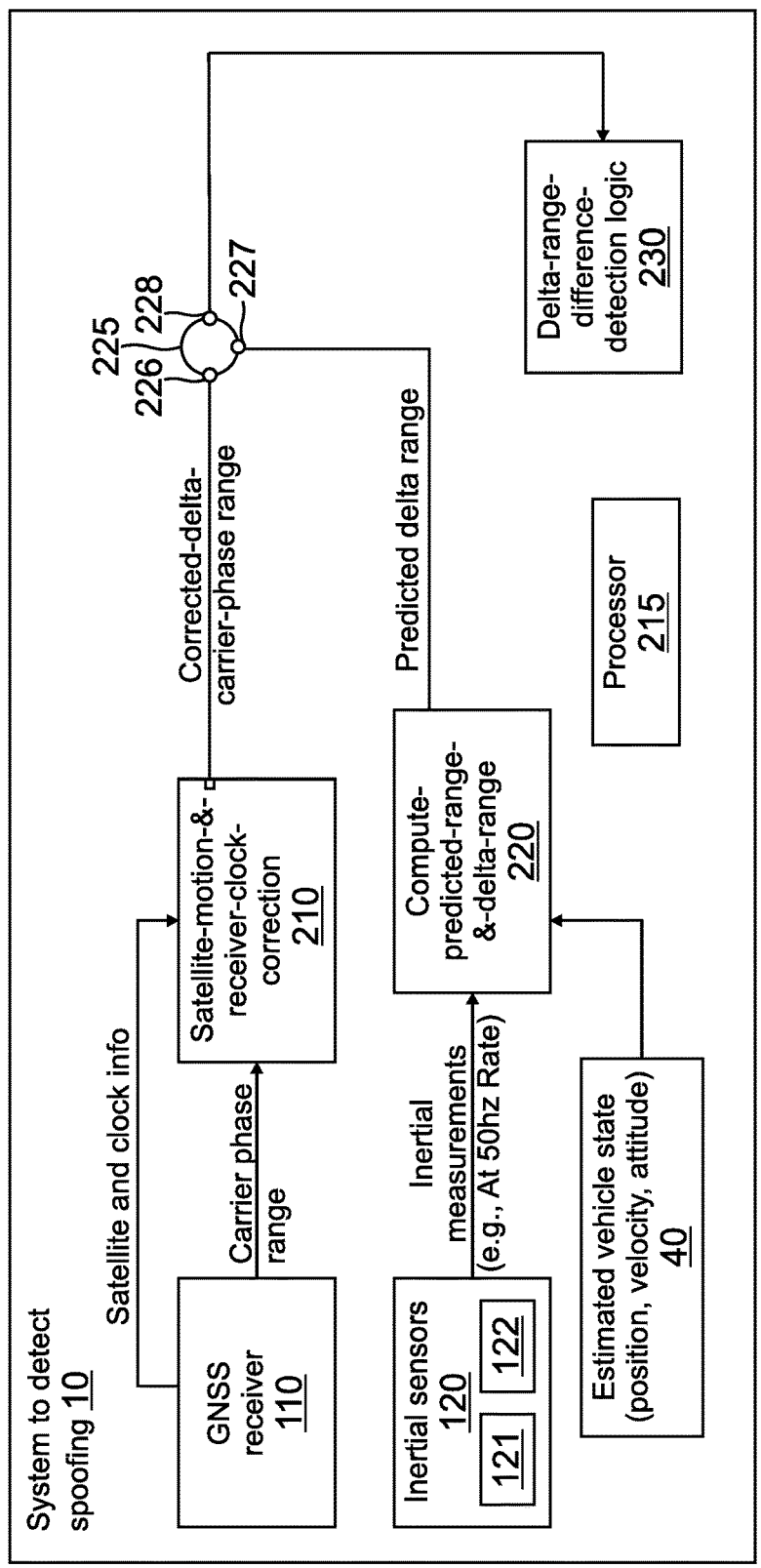
FIG. 1 illustrates an embodiment of a system to detect GNSS spoofing in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments of the system and methods described below are capable of detecting spoofing using a single, fixed antenna attached to a vehicle. In implementations of embodiments described herein, the difference between the GNSS carrier phase observables (i.e., a corrected-delta-carrier-phase range) and inertial-based predicted delta range are determined on an epoch-by-epoch basis using logic processing techniques to detect small changes and unexpected differences that indicate a spoofing occurred in the current epoch. One such implementation is described below with reference to FIGS. 1 and 3. The epoch-by-epoch technique detects spoofs that cause the GNSS receiver to jump in position.

In other implementations of embodiments described herein, a curve fitting technique is used to determine if a slow-spoofing attack in underway during a plurality of epochs. In a slow-spoofing attack, the attacker slowly ramps up the error in the signals being sent to the vehicle. A slow-spoofing attack is not discernable by an epoch-by-epoch detection system since the errors change so gradually. To detect a slow-spoofing attack, GNSS carrier phase observables (i.e., a corrected-carrier-phase range) are collected for all or most of a plurality of epochs and are used to generate a first curve. Inertial-based predicted ranges are also collected for all or most of the same plurality of epochs and are used to generate a second curve. Any unexpected differences between parameters for the first curve and the second curve indicate a spoofing occurred during the last plurality of epochs. One such implementation to detect a slow-spoofing attack is described below with reference to FIGS. 4-6.

In other implementations of embodiment described herein, the epoch-by-epoch detection logic and the curve-fit technique to detect slow spoofing are both implemented to detect a slow-spoofing attack and to quickly detect a strong sudden spoofing attack. One such implementation is described below with reference to FIGS. 7-8.

Some prior art spoof detection systems use position domain information from the GNSS receiver (or from an inertial sensor) or use carrier phase from the GNSS receiver. The prior art spoof detection systems do not use the change (corrected or uncorrected) in carrier phase range (i.e., delta-carrier-phase range) between two sequential epochs for each of the satellites in view of the GNSS receiver. Likewise, the prior art spoof detection systems do not use curve-fitting techniques to detect slow-spoofing attacks. The key characteristic of very small error in delta carrier phase enables this technique to be much more effective than methods in prior art that operate in the position domain.

An epoch is that time when a GNSS receiver sends a set of measurements (e.g., a set of ranges) for the satellites in view of the GNSS receiver. In one implementation of this embodiment, the GNSS receiver sends the set of measurements at a rate of 1 Hz (i.e., 1/second). The inertial sensors typically send inertial measurements at a rate of 50 Hz to 100 Hz (i.e., 50 to 100 times per second).

A carrier phase range (distance) between the GNSS receiver and a satellite is obtained by multiplying the wavelength of the carrier signal by the accumulated carrier phase, which is also known in the art as an integrated carrier phase. The terms "carrier phase" and "carrier phase range" are used interchangeably herein. As used herein a "predicted range" is the range (distance) between the receiver and a satellite that is obtained based on observed inertial measurements. As used herein, the term "predicted delta range" is a change in the range between the receiver and a satellite between a current epoch and a last epoch (i.e., the epoch just prior to the current epoch).

The corrected-carrier-phase range for a current epoch is obtained by computing the satellite position at a current epoch and a last epoch using the orbit ephemeris data as provided by the satellites and correcting for the known satellite motion, receiver clock error and error rate. Although the orbit information as computed using broadcast ephemeris is not accurate to better than a few millimeters, the epoch-to-epoch error is very small. The difference between the corrected-carrier-phase range for the current epoch and the corrected-carrier-phase range for the last epoch is computed to obtain the corrected-delta-carrier-phase range from one epoch to the next sequential epoch. In a typical embodiment the corrected carrier phase and delta carrier phase may be computed in support of a Kalman filter using those measurements along with inertial sensor data.

Figure 2A:
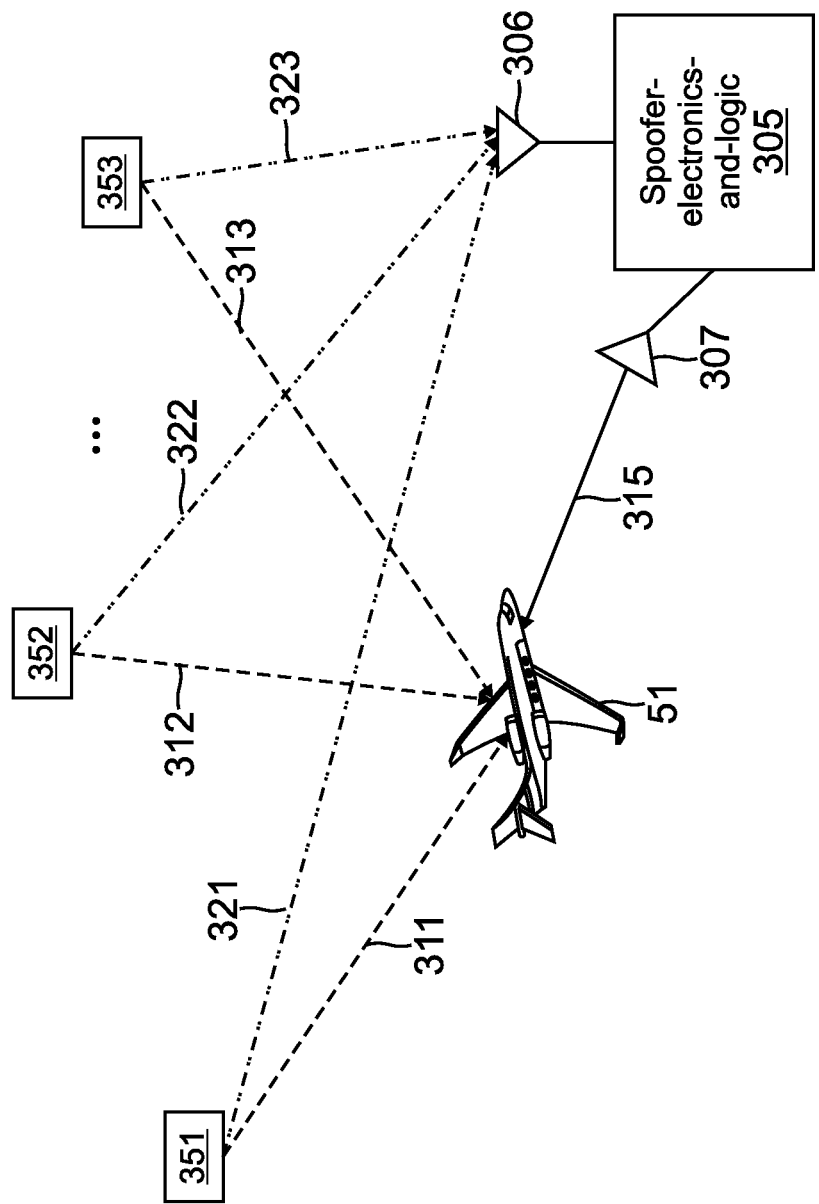
FIG. 2A shows an exemplary GNSS spoofing attack on a vehicle that is unprotected from a spoofing attack.
Figure 2B:
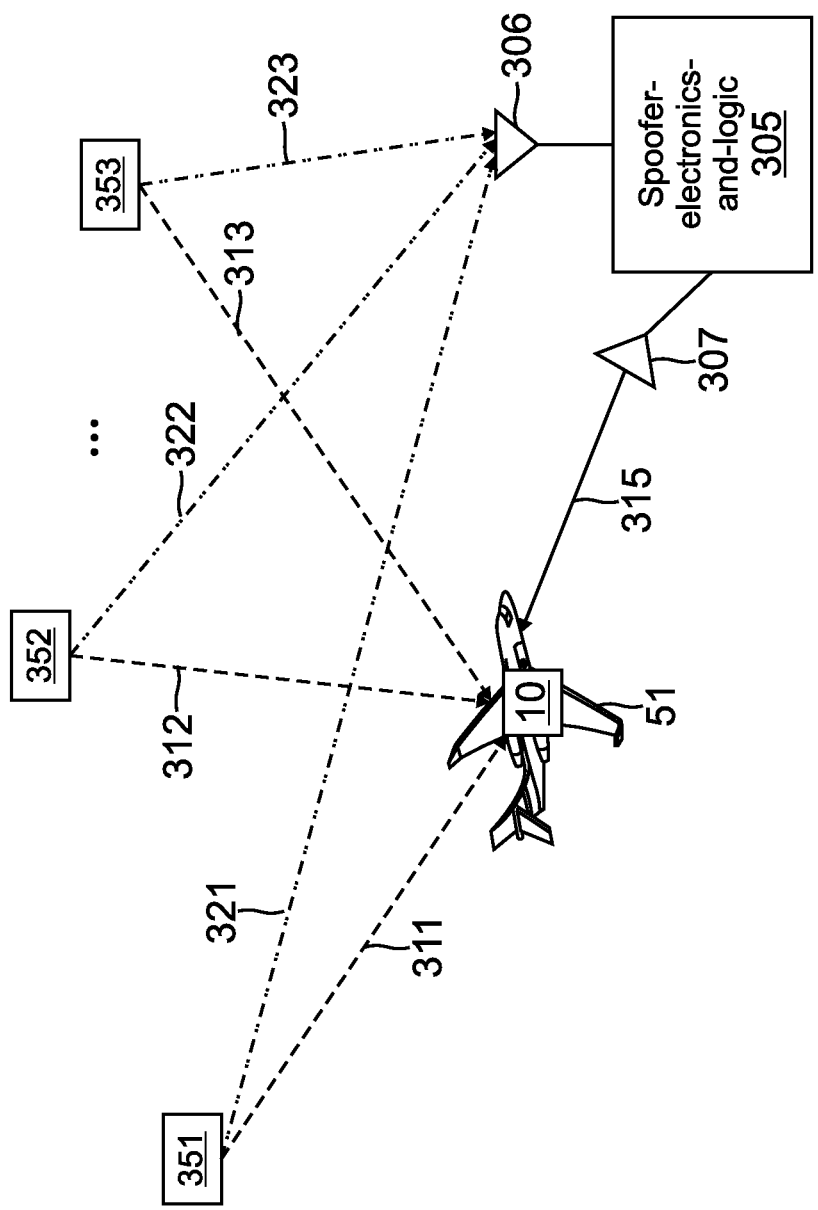
FIG. 2B shows an exemplary GNSS spoofing attack on a vehicle that houses the system of FIG. 1 to detect GNSS spoofing in accordance with the present application.
Figure 3:
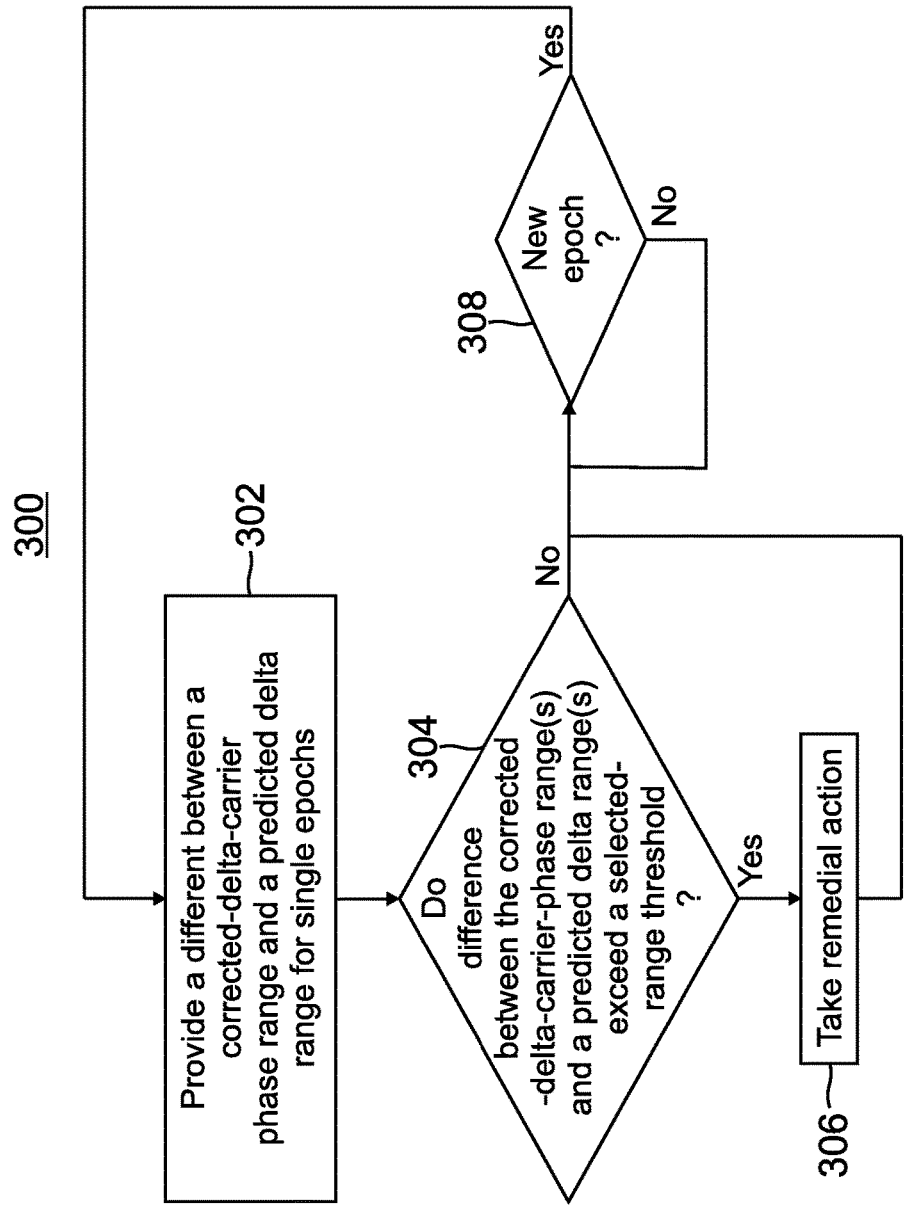
FIG. 3 illustrates an embodiment of a method to detect GNSS spoofing using the system of FIG. 1 in accordance with the present application.

FIG. 1 illustrates an embodiment of a system 10 to detect GNSS spoofing in accordance with the present application. FIG. 2B shows an exemplary GNSS spoofing attack on a vehicle 50 that houses the system 10 of FIG. 1 to detect GNSS spoofing in accordance with the present application. FIG. 2B differs from FIG. 2A in that the vehicle 51 in FIG. 2A is unprotected from a spoofing attack while the vehicle 50 of FIG. 2B includes a system 10 to protect the vehicle 50. System 10 is configured to detect and prevent a spoofing attach on a global navigation satellite system (GNSS) receiver 110 (FIG. 1) that is communicatively coupled to a GNSS system. The GNSS system includes a plurality of satellites 351, 352, and 353 that are communicatively coupled, via respective wireless links 311-313, to the GNSS receiver 110 in the vehicle 51 shown in FIG. 2B. The system 10 on the vehicle 50 detects a spoofing event and takes remedial action to prevent modified data from the spoofer-electronics-and-logic 305 from being used in the calculation of the position of the vehicle 50. FIG. 3 illustrates an embodiment of a method 300 to detect GNSS spoofing using the system 10 of FIG. 1 in accordance with the present application. If GNSS spoofing is detected method 300 prevents the spoofing attack on the GNSS receiver 110 in the vehicle 51 (FIG. 2B).

The system 10 includes a global navigation satellite system (GNSS) receiver 110, a satellite-motion-and-receiver-clock-correction module 210, inertial sensors 120, a compute-predicted-range-and-delta-range module 220, delta-range-difference-detection logic 230, a subtractor 225, and a processor 215. The satellite-motion-and-receiver-clock-correction module 210, the compute-predicted-range-and-delta-range module 220, and the delta-range-difference-detection logic 230 include algorithms and memory caches. In one implementation of this embodiment, the satellite-motion-and-receiver-clock-correction module 210, the compute-predicted-range-and-delta-range module 220, and the delta-range-difference-detection logic 230 also include internal processors to execute the algorithms. In another implementation of this embodiment, the algorithms in the satellite-motion-and-receiver-clock-correction module 210, the compute-predicted-range-and-delta-range module 220, and the delta-range-difference-detection logic 230 are executed by one or more processors 215, which are external to the satellite-motion-and-receiver-clock-correction module 210, the compute-predicted-range-and-delta-range module 220, and the delta-range-difference-detection logic 230. The estimated vehicle state 40 is input to the compute-predicted-range-and-delta-range module 220. The estimated vehicle state 40 is the navigation solution calculated by the larger navigation system that includes the system 10.

The global navigation satellite system (GNSS) receiver 110 is communicatively coupled to input data via wireless data links 311, 312, and 313 from a plurality of respective satellites 351, 352, and 353. The GNSS receiver 110 measures ranges (distances) between from the GNSS receiver 110 and each of the respective satellites 351-353 (FIG. 2B). The range measurements for a satellite change over time based on the orbital motion of the satellite, the motion of the antenna on the vehicle over time, and clock error. The measured ranges are used to compute the location of the vehicle 50 housing the system 10. The GNSS receiver 110 and associated navigation system correctly determine the location of the vehicle 50 whether or not the vehicle 50 experiences a spoofing attack.

A change in the position of the GNSS receiver 110 is determined based on the motion of the satellites 351-353, the motion of the antenna on the vehicle 50, which is typically moving when being spoofed, and the clock error in the GNSS receiver 110. The GNSS receiver 110 determines the range measurements to the satellites 351-353 based on the pseudorange and carrier phase. Pseudorange is not used in the method described herein. Data from the satellites 351-353 is processed periodically once every epoch. The period of the epoch can be based on a time signal or is offset from coordinated universal time (UTC), depending on the type of satellite system.

The global navigation satellite system (GNSS) receiver 110 is communicatively coupled to periodically (at the period of an epoch) output information indicative of a carrier phase range for the plurality of satellites 351-353 in view of the GNSS receiver 110 to satellite-motion-and-receiver-clock-correction module 210. The information indicative of the carrier phase range is referred to herein as "carrier phase" or "carrier phase range". The satellite-motion-and-receiver-clock-correction module 210 is communicatively coupled to periodically input information indicative of the carrier phase range from the GNSS receiver 110. The satellite-motion-and-receiver-clock-correction module 210 is also communicatively coupled to periodically input satellite and clock information from the GNSS receiver 110.

The carrier phase of a first satellite 351 is the accumulated phase of the carrier signal emitted from the first satellite 351 and detected at the GNSS receiver 110. The carrier phase of a second satellite 352 is the accumulated phase of the carrier signal emitted from the second satellite 352 and detected at the GNSS receiver 110. Likewise, the carrier phase of an $N^{th}$ satellite 353 is the accumulated phase of the carrier signal emitted from the $N^{th}$ satellite 353 and detected at the GNSS receiver 110.

A first carrier phase range is the distance, at a first epoch, between the GNSS receiver 110 and a first satellite 351 that is in view of the GNSS receiver. A second carrier phase range is the distance, at a second epoch, between the GNSS receiver and the first satellite 351. The second epoch sequentially follows the first epoch. A first delta-carrier-phase range is the difference between the first carrier phase range and the second carrier phase range.

A third carrier phase range is the distance, at the first epoch, between the GNSS receiver 110 and a second satellite 352 that is in view of the GNSS receiver. A fourth carrier phase range is the distance, at the second epoch, between the GNSS receiver 110 and the second satellite 352. A second delta-carrier-phase range is the difference between the third carrier phase range and the fourth carrier phase range.

If N satellites are within the view of the GNSS receiver at the first and second epoch, then a $2N^{th}$ carrier phase range is the distance, at the first epoch, between the GNSS receiver 110 and the $N^{th}$ satellite 353. A $(2N+1)^{th}$ carrier phase range is the distance, at the second epoch, between the GNSS receiver 110 and the $N^{th}$ satellite 353. An $N^{th}$ delta-carrier-phase range is the difference between the $2N^{th}$ carrier phase range and the $(2N+1)^{th}$ carrier phase range.

At the first epoch, the satellite-motion-and-receiver-clock-correction module 210 input inputs the first carrier phase range, the third carrier phase range, and the $(2N+1)^{th}$ carrier phase range. At the second epoch, the satellite-motion-and-receiver-clock-correction module 210 inputs the second carrier phase range, the fourth carrier phase range, and the $(2N)^{th}$ carrier phase range. For each of the N satellites 351-353, the satellite-motion-and-receiver-clock-correction module 210 outputs a corrected delta-carrier-phase range.

The corrected-carrier-phase range and the corrected-delta-carrier-phase range are computed as part of the GNSS position solution computation in the satellite-motion-and-receiver-clock-correction module 210. The corrected delta-carrier-phase range is obtained by first removing the change in range caused by known satellite motion from the raw range data and then removing the clock error. The first delta-carrier-phase range is corrected for known receiver clock error and error rate to form a first corrected-delta-carrier-phase range. The second delta-carrier-phase range is corrected for known receiver clock error and error rate to form a second corrected-delta-carrier-phase range. The $N^{th}$ delta-carrier-phase range is corrected for known receiver clock error and error rate to form an $N^{th}$ corrected-delta-carrier-phase range.

While the GNSS receiver 110 and satellite-motion-and-receiver-clock-correction module 210 are generating the corrected-delta-carrier-phase ranges for the plurality of satellites 351-353, the inertial sensors 120 and the compute-predicted-range-and-delta-range module 220 are generating predicted delta ranges based on inertial data for the plurality of satellites 351-353. The inertial sensors 120 include at least one accelerometer 121 and/or at least one gyroscope 122. In one implementation of this embodiment, the inertial sensors 120 include two accelerometers 121 and two gyroscopes 122. In another implementation of this embodiment, the inertial sensors 120 include three accelerometers 121 and three gyroscopes 122. In a typical embodiment, predicted range and delta range are computed from navigation state estimates as provided by a Kalman filter.

Inertial measurements are periodically input (at the period of the inertial navigation system) from inertial sensors 120 at a compute-predicted-range-and-delta-range module 220. The compute-predicted-range-and-delta-range module 220 computes the predicted delta range from the compute-predicted-range-and-delta-range module 220 for the last epoch for each satellite 351-303 in view of the GNSS receiver 110 based on the inertial data from the inertial sensors 120. A first predicted delta range is the change in the range between the GNSS receiver 110 and the first satellite 351 between the current epoch and the last epoch. A second predicted delta range is change in the range between the GNSS receiver 110 and the second satellite 352 between the current epoch and the last epoch. An $N^{th}$ predicted delta range is the change in the range between the GNSS receiver 110 and the $N^{th}$ satellite 353 between the current epoch and the last epoch.

The corrected-delta-carrier-phase range is input to a first input 226 of a subtractor 225 from the satellite-motion-and-receiver-clock-correction module 210. Specifically, for N satellites 351-353 in view of the GNSS receiver 110 for the current epoch, the first corrected-delta-carrier-phase range, the second corrected-delta-carrier-phase range, and all the corrected-delta-carrier-phase ranges from the third corrected-delta-carrier-phase range to $N^{th}$ corrected-delta-carrier-phase range are input to the first input 226 of subtractor 225.

The predicted delta range is input to a second input 227 of the subtractor 225 from the compute-predicted-range-and-delta-range module 220. Specifically, for the N satellites 351-353 in view of the GNSS receiver 110, the first predicted delta range, the second predicted delta range, and all the predicted delta ranges from the third predicted delta range to $N^{th}$ predicted delta range are input to the second input 227 of subtractor 225. In this manner, the subtractor 225 provides a difference between a corrected delta carrier phase range and a predicted delta range for a current epoch for each of the satellites in view of the GNSS receiver 110 (see block 302 of method 300).

The difference between the corrected-delta-carrier-phase range and the predicted delta range for each of the satellites in view of the GNSS receiver 110 for the current epoch is output from output 228 of the subtractor 225 to delta-range-difference-detection logic 230. For an exemplary current epoch, subtractor 225 outputs: the difference between the first corrected-delta-carrier-phase range and the first predicted delta range; the difference between the second corrected-delta-carrier-phase range and the second predicted delta range; and the difference between the third (e.g., $N^{th}$) corrected-delta-carrier-phase range and the third (e.g., $N^{th}$) predicted delta range.

The delta-range-difference-detection logic 230 determines if the GNSS receiver 110 was spoofed during the current epoch. In one implementation of this embodiment, the delta-range-difference-detection logic 230 determines if the difference exceeds a selected-range threshold in order to determine the GNSS receiver 110 was spoofed during the current epoch (see block 304 of method 300) for the satellite N. In another implementation of this embodiment, the selected-range threshold is set by a designer of the system 10. In a typical embodiment, if spoofing is detected in delta range for a particular satellite N, that satellite is not used for future position computations for a period of time until it is determined that the spoofing is no longer present.

If any one of the differences for the current epoch exceeds the selected-range threshold, the delta-range-difference-detection logic 230 determines the GNSS receiver 110 is spoofed during the current epoch for satellite N and the flow of method 300 moves from block 304 to block 306.

At block 306, remedial action is taken. The remedial action includes removing the spoofed data, which is sent via data link 315 from the spoofer-electronics-and-logic 305, in the calculation of the vehicle state by the navigation system in the vehicle 50. In one implementation of this embodiment, the delta-range-difference-detection logic 230 determines the difference between the second corrected-delta-carrier-phase range and the second predicted delta range exceeded the selected-range threshold while the difference between the first corrected-delta-carrier-phase range and the first predicted delta range and the difference between the $N^{th}$ corrected-delta-carrier-phase range and the $N^{th}$ predicted delta range did not exceed the selected-range threshold. In this case, the data from the second satellite 352 was spoofed and is not used by the navigation system in determining the current and future navigation solution. The flow of method 300 proceeds from block 306 to block 308.

If it is determined at block 304 that the GNSS receiver 110 is not spoofed during the current epoch and the flow of method 300 moves from block 304 to block 308. At block 308, it is determined if the current epoch is not the last epoch (i.e., if a new set of data has been input from the GNSS receiver 110 to the satellite-motion-and-receiver-clock-correction module 210 for a new epoch). If the current epoch is not the last epoch, the flow continues to loop back to block 308 until the current epoch is now the last epoch and the flow of method 300 proceeds back to block 302. In this manner, the input to the GNSS receiver 110 is checked every epoch for a spoofing attack. Since the corrected-delta-carrier-phase range and the predicted delta range are accurate and precise values, the system 10 accurately detects a spoofing attack, with few (if any) false detections.

Figure 4:
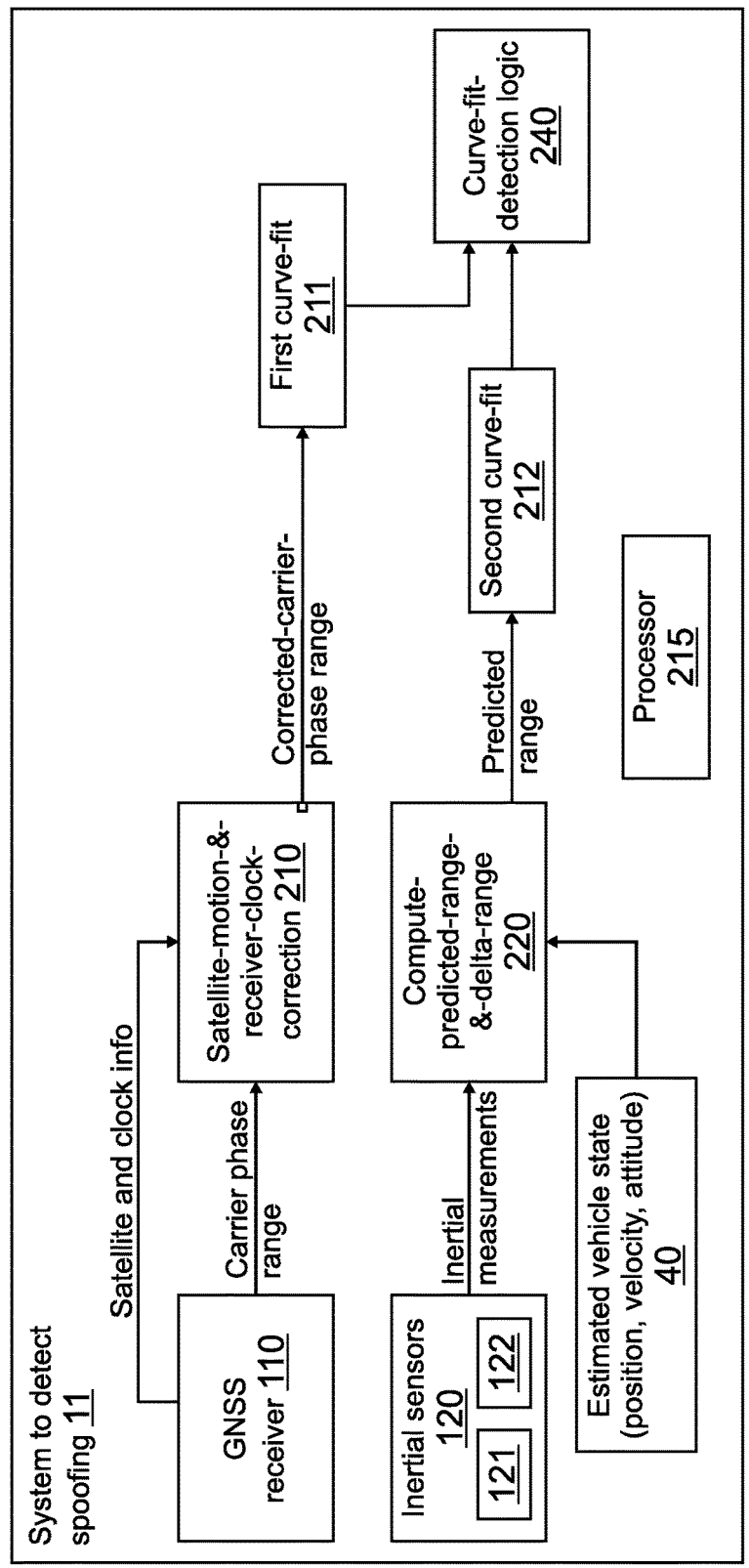
FIG. 4 illustrates an embodiment of a system to detect GNSS spoofing in accordance with the present application.
Figure 6:
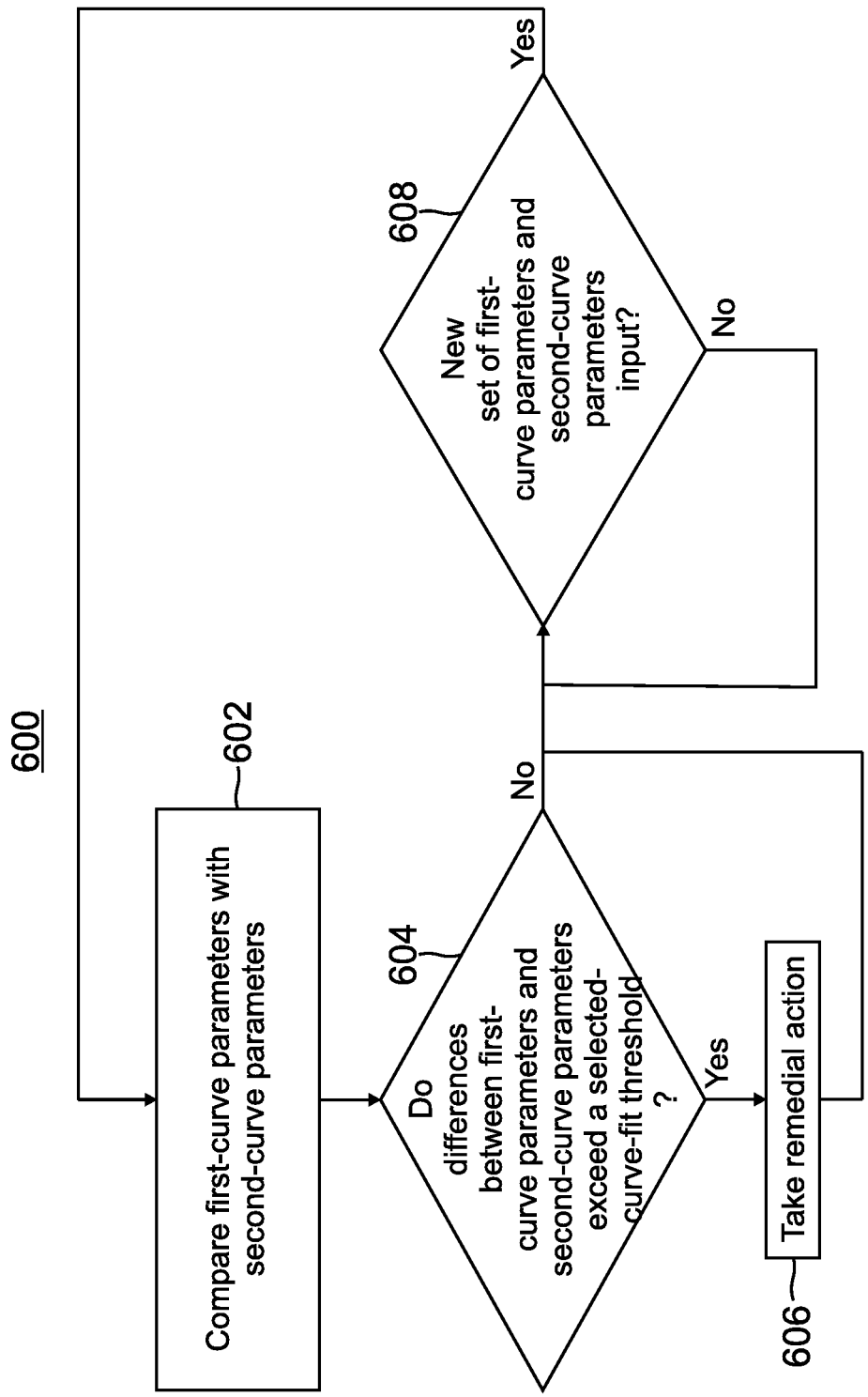
FIG. 6 illustrates an embodiment of a method to detect GNSS spoofing using the system of FIG. 4 in accordance with the present application.

FIG. 4 illustrates an embodiment of a system 11 to detect GNSS spoofing in accordance with the present application. FIG. 5A illustrates an exemplary first curve 501 and second curve 502 generated for a first plurality of epochs $e_1$-$e_n$ by the system of FIG. 4. FIG. 5B illustrates an exemplary first curve 511 and second curve 512 generated for a second plurality of epochs $e_m$-$e_{(m+k)}$ by the system of FIG. 4. FIG. 6 illustrates an embodiment of a method 600 to detect a GNSS spoofing attack using the system 11 of FIG. 4 in accordance with the present application.

The system 11 includes a global navigation satellite system (GNSS) receiver 110, a satellite-motion-and-receiver-clock-correction module 210, inertial sensors 120, a compute-predicted-range-and-delta-range module 220, a first curve-fit module 211, a second curve-fit module 212, curve-fit-detection logic 240, and a processor 215. The estimated vehicle state (i.e., position, velocity, and attitude) are input from the navigation system on the vehicle 50. The GNSS receiver 110 in system 11 has the same structure and function as the GNSS receiver 110 in system 10 as described above with reference to FIG. 1. The inertial sensors 120 in system 11 has the same structure and function as the inertial sensors 120 in system 10 as described above with reference to FIG. 1.

The first curve-fit module 211, the second curve-fit module 212 and the curve-fit-detection logic 240 include algorithms and memory caches. In one implementation of this embodiment, the first curve-fit module 211, the second curve-fit module 212, and the curve-fit-detection logic 240 also include internal processors to execute the algorithms. In another implementation of this embodiment, the algorithms in the first curve-fit module 211, the second curve-fit module 212, and the curve-fit-detection logic 240 are executed by at least one external processor 215. In yet another implementation of this embodiment, the algorithms in the first curve-fit module 211, the second curve-fit module 212, and the curve-fit-detection logic 240 are executed by a combination of internal processors and at least one external processor 215.

The satellite-motion-and-receiver-clock-correction module 210 outputs corrected-carrier-phase ranges to the first curve-fit module 211 for a plurality of sequential epochs. The following process is applied to each satellite within view of the GNSS receiver 110. The first curve-fit module 211 stores the corrected-carrier-phase ranges as the corrected-carrier-phase ranges are input to the first curve-fit module 211 during the plurality of sequential epochs (e.g., n epochs $e_1$-$e_n$, wherein n is a positive integer, as shown in FIG. 5A). The selected number of epochs (e.g., n epochs) to be fitted to a curve is selected by a designer or a user of system 11. Once the corrected-carrier-phase ranges for the selected number of epochs are input, the first curve-fit module 211 fits the plurality of corrected-carrier-phase ranges (shown as solid vertical lines in FIG. 5A) for the respective plurality of sequential epochs to a first curve 501 of a selected appropriate order. FIG. 5A shows an exemplary first curve 501 (shown as an interrupted solid curve) for the plurality of n epochs $e_1$-$e_n$, wherein n is a positive integer.

The compute-predicted-range-and-delta-range module 220 outputs predicted ranges to the second curve-fit module 212 for the same plurality of sequential epochs (e.g., n epochs $e_1$-$e_n$) for which the corrected-carrier-phase ranges are sent to the first curve-fit module 211. The predicted range is the range (distance) between the receiver and a satellite that is obtained based on observed inertial measurements from the inertial sensors 120. The rate of input form the inertial sensors 120 is typically faster then the rate input of epochs. In one implementation of this embodiment, the compute-predicted-range-and-delta-range module 220 only operates on the data obtained at the same time that the data for the epoch is obtained to determine if the system 10 is being spoofed. In another implementation of this embodiment, the compute-predicted-range-and-delta-range module 220 operates on all the data obtained between the last epoch and the current epoch $e_i$, where i is a positive integer to indicate the $i^{th}$ epoch is a current epoch, to determine if the system 10 is being spoofed. In yet another implementation of this embodiment, the compute-predicted-range-and-delta-range module 220 operates on a selected portion of the data obtained between the last epoch and the current epoch $e_i$ to determine if the system 10 is being spoofed.

The second curve-fit module 212 stores the predicted ranges as the corrected-predicted ranges are input to the second curve-fit module 212 during the plurality of sequential epochs. Once the predicted ranges for the selected number of epochs are input, the second curve-fit module 212 fits the plurality of predicted ranges (shown as dashed vertical lines in FIG. 5A) for the respective plurality of sequential epochs to a second curve 502 of the selected appropriate order. The dashed curves vertical lines to represent the data input from the inertial sensors 120 between the epochs is not shown in FIGS. 5A and 5B for clarity of viewing. FIG. 5A shows an exemplary second curve 502 (shown as an interrupted dashed curved) for the plurality of n epochs $e_1$-$e_n$. The dashed vertical lines for the predicted ranges are shown to be offset from the solid vertical lines for the corrected-carrier-phase ranges in order to illustrate the difference in range for each epoch. It is to be understood that the epochs occur at the same time.

In one implementation of this embodiment, the first curve-fit module 211 and the second curve-fit module 212 generate, respectively, first curves and second curves that include overlapping epochs. For example, after first curve 501 and second curve 502 are generated for epochs $e_1$-$e_n$, another first curve 501 and another second curve 502 are generated for epochs $e_3$-$e_{(n+2)}$. In this manner, a slow spoofing attack that starts after the epoch $e_1$ is recognized to prior to epoch $e_n$.

In another implementation of this embodiment, the first curve-fit module 211 generates first curves without overlapping any epochs. For example, as shown in FIG. 5B, after first curve 501 and second curve 502 are generated for epochs $e_1$-$e_n$, another first curve 511 and another second curve 512 are generated. The first curve 511 is generated by fitting the plurality of corrected-carrier-phase ranges (shown as solid vertical lines in FIG. 5B) for the respective plurality of sequential epochs $e_m$-$e_{(m+k)}$, where m=n+1 and k=(n−1). The second curve 512 is generated by fitting the plurality of predicted ranges (shown as dashed vertical lines in FIG. 5B) for the respective plurality of sequential epochs $e_m$-$e_{(m+k)}$.

The first curve-fit module 211 determines a set of first-curve parameters associated with the first curve 501 based on fitting the corrected-carrier-phase ranges to the first curve 501 to the selected appropriate order. The second curve-fit module 212 determines a set of second-curve parameters based on fitting the predicted ranges to the second curve 502 to the same selected appropriate order.

In one implementation of this embodiment, the first curve-fit module 211 uses algorithms to determine the appropriate order for a given plurality of sequential epochs. In this case, the first curve-fit module 211 sends information indicative of the appropriate order for the given plurality of sequential epochs to the second curve-fit module 212. In another implementation of this embodiment, a system designer selects the selected appropriate order, which is embedded in the first curve-fit module 211 and second curve-fit module 212.

The first curve-fit module 211 outputs information indicative of first-curve parameters associated with the first curve 501 to curve-fit-detection logic 240. The second curve-fit module 212 outputs information indicative of second-curve parameters associated with the second curve 502 to curve-fit-detection logic 240. As used herein, first-curve parameters include, but are not limited to, parameters and/or coefficients that describe the first curve. First-curve parameters are based on the order of the selected appropriate order of the first curve. As used herein, second-curve parameters include, but are not limited to, parameters and/or coefficients that describe the second curve. Second-curve parameters are based on the order of the selected appropriate order of the second curve. The comparisons between the first-curve parameters and the second-curve parameters described herein are made between the same types of parameters. Specifically, the same types of the first-curve parameters are compared to the same types of the second-curve parameters to determine if a slow-spoofing has occurred. System 12 is also able to determine if there is a strong sudden spoofing attack that causes a jump in the GNSS receiver 110.

An exemplary listing of first and second curve parameters is shown in Table 1 below for a first satellite. Each satellite in view of the GNSS receiver 110 has a similar table. The parameters in exemplary Table 1 include, but are not limited to, parameters and/or coefficients that describe the associated curve. The letters a, b, c, d, f, and g represent numbers or equations as is understandable to one skilled in the art.

The curve-fit-detection logic 240 inputs the information indicative of first-curve parameters associated with the first curve 501 (e.g., for Table 1 information indicative of first-curve parameters includes a, c, d, and f). The curve-fit-detection logic 240 inputs the information indicative of second-curve parameters associated with the second curve 502 (e.g., for Table 1 information indicative of second-curve parameters includes b, c, d, and g). The curve-fit-detection logic 240 compares first-curve parameters associated with the first curve (e.g., first curve 501 or 502) with second-curve parameters associated with the second curve (e.g., first curve 511 or 512) (see block 602 of method 600 in FIG. 6). For the data shown in Table 1, the curve-fit-detection logic 240 determines: the second and third parameters are equal; the first parameter of the second curve differs from the first parameter of the first curve by (b−a); and the fourth parameter of the second curve differs from the fourth parameter of the first curve by (g−f).

TABLE 1

|  | First curve<br>First satellite | Second curve<br>First satellite |
| --- | --- | --- |
| $1^{st}$ parameter | a | b |
| $2^{nd}$ parameter | c | d |

TABLE 1-continued

|  | First curve<br>First satellite | Second curve<br>First satellite |
|---|---|---|
| $3^{rd}$ parameter | e | f |
| $4^{th}$ parameter | g | h |

At block 604 of method 600, the curve-fit-detection logic 240 determines if the differences between the first-curve parameters and the second-curve parameters exceed a selected-curve-fit threshold. In the exemplary case of the data shown in Table 1, the curve-fit-detection logic 240 determines if (b-a), (d-c), (f-e), and/or (h-g) exceed the selected-curve-fit threshold. In one implementation of this embodiment, the selected-curve-fit threshold is set by a designer of the system 11. If it is determined at block 604 that the differences between the first-curve parameters and the second-curve parameters exceed a selected-curve-fit threshold, the GNSS receiver 110 was spoofed (either a fast spoof or a slow spoof) during the epochs $e_1$-$e_n$. If it is determined at block 604 that the differences between the first-curve parameters and the second-curve parameters do not exceed a selected-curve-fit threshold, the GNSS receiver 110 was not spoofed for satellite N during the epochs $e_1$-$e_n$.

If the differences between the first-curve parameters and the second-curve parameters exceed a selected-curve-fit threshold for one or more of the satellites in view of the GNSS receiver 110, the flow of method 600 proceeds from block 604 to block 606. At block 606, remedial action is taken. The remedial action includes removing the spoofed data associated with the spoofed satellite input to the GNSS receiver 110 during epochs $e_1$-$e_n$, from the calculation of the vehicle state by the navigation system in the vehicle 50. The flow of method 600 proceeds from block 606 to block 608.

If the differences between the first-curve parameters and the second-curve parameters do not exceed a selected-curve-fit threshold for any of the satellites in view of the GNSS receiver 110, the flow of method 600 proceeds from block 604 to block 608.

At block 608 it is determined if a new set of first-curve parameters and second-curve parameters have been input to the curve-fit-detection logic 240. If a new set of first-curve parameters and second-curve parameters have not been input to the curve-fit-detection logic 240, the flow continues to loop back to block 608 until the new set of first-curve parameters and second-curve parameters have been input to the curve-fit-detection logic 240. If it is determined at block 608 that a new set of first-curve parameters and second-curve parameters have been input to the curve-fit-detection logic 240, the flow of method 600 proceeds from block 608 to block 602. In this manner, the input to the GNSS receiver 110 is checked for a plurality of sequential epochs for a spoofing attack. Since the corrected-carrier-phase ranges and the predicted ranges for a plurality of epochs are monitored based on a curve fit, the system 10 accurately detects a slow-spoofing attack.

Figure 7:
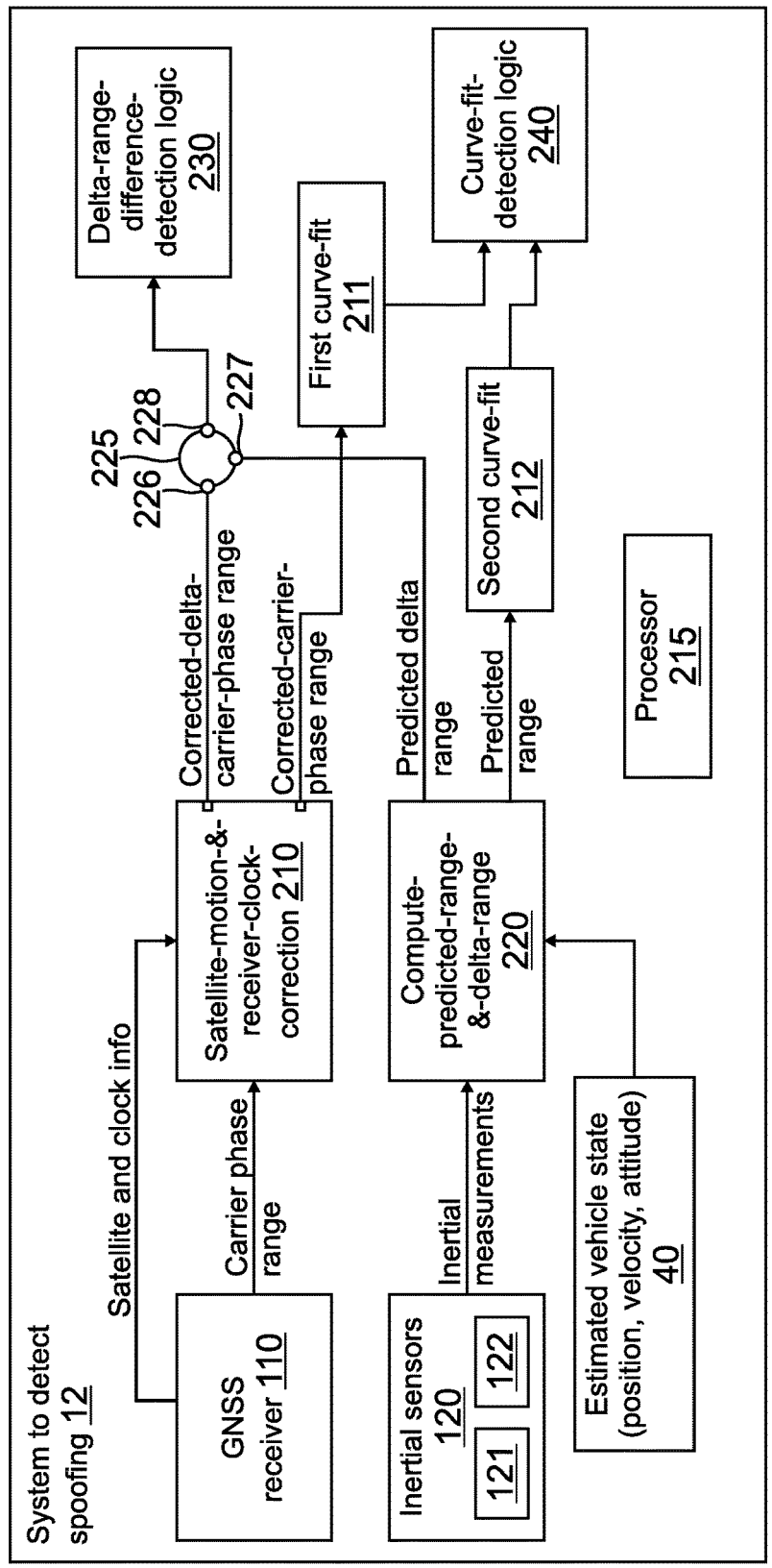
FIG. 7 illustrates an embodiment of a system to detect GNSS spoofing in accordance with the present application.

FIG. 7 illustrates an embodiment of a system 12 to detect GNSS spoofing in accordance with the present application. FIG. 8 illustrates an embodiment of a method 800 to detect GNSS spoofing using the system of FIG. 7 in accordance with the present application. The system 12 is configured with the combined components of system 10 of FIG. 1 and system 11 of FIG. 4. System 12 includes a global navigation satellite system (GNSS) receiver 110, a satellite-motion-and-receiver-clock-correction module 210, inertial sensors 120, a compute-predicted-range-and-delta-range module 220, delta-range-difference-detection logic 230, a subtractor 225, a first curve-fit module 211, a second curve-fit module 212, a curve-fit-detection logic 240, and a processor 215. The global navigation satellite system (GNSS) receiver 110, the satellite-motion-and-receiver-clock-correction module 210, the inertial sensors 120, the compute-predicted-range-and-delta-range module 220, the delta-range-difference-detection logic 230, the subtractor 225, the first curve-fit module 211, the second curve-fit module 212, the curve-fit-detection logic 240, and the processor 215 have structures and functions similar to the structures and functions described above with reference to the systems 10 and 11 in respective FIGS. 1 and 4.

The flow of the method 800 of is described with reference to the system 12 of FIG. 7. At block 802, the subtractor 225 provides a difference between a corrected delta carrier phase range and a predicted delta range for a current epoch $e_i$ to the delta-range-difference-detection logic 230.

At block 804, the delta-range-difference-detection logic 230 determines if the difference exceeds a selected-range threshold in order to determine the GNSS receiver 110 was spoofed during the current epoch $e_i$. If any one of the differences for the satellites in view of the GNSS receiver 110 during the current epoch $e_i$ exceeds the selected-range threshold, the delta-range-difference-detection logic 230 determines the GNSS receiver 110 is spoofed during the current epoch and the flow of method 800 moves from block 804 to block 806.

At block 806, remedial action is taken as described above with reference to block 306 in method 300 of FIG. 3. The flow of method 800 proceeds from block 806 to block 808. At block 808, if it is determined if the current epoch $e_i$ is not the last epoch. If the current epoch $e_i$ is not the last epoch, the flow continues to loop back to block 808 until the current epoch $e_i$ has become the last epoch (i.e., a new set of data has been input from the GNSS receiver 110 to the satellite-motion-and-receiver-clock-correction module 210 for a new current epoch $e_j$, where j=i+1) and the flow of method 800 proceeds back to block 802. In this manner, the input to the GNSS receiver 110 is checked for the next epoch following a spoofing attack when a spoofing attack has been determined for a current epoch.

If it is determined at block 804 that the GNSS receiver 110 is not spoofed during the current epoch $e_i$, the flow of method 800 moves from block 804 to block 810. At block 810, the curve-fit-detection logic 240 compares first-curve parameters associated with a first curve 501 with second-curve parameters associated with a second curve 502 for each of the satellites 351-353 in view of the GNSS receiver 110.

At block 812 of method 800, the curve-fit-detection logic 240 determines if the differences between the first-curve parameters and the second-curve parameters exceed a selected-curve-fit threshold for any of the satellites 351-353 in view of the GNSS receiver 110. If it is determined at block 812 that the differences between the first-curve parameters and the second-curve parameters exceed a selected-curve-fit threshold, the GNSS receiver 110 was spoofed (a slow-spoofing attack) during the epochs $e_1$-$e_n$. This slow spoof was not picked up on the epoch-by-epoch evaluation at block 804 since the error is being introduced gradually by the attacker. If it is determined at block 812 that the differences between the first-curve parameters and the second-curve parameters do not exceed a selected-curve-fit threshold, the GNSS receiver 110 was not slow spoofed during the epochs $e_1$-$e_n$.

When the differences between the first-curve parameters and the second-curve parameters exceed a selected-curve-fit threshold for one or more of the satellites in view of the GNSS receiver 110, the flow of method 600 proceeds from block 812 to block 806. At block 806, remedial action is taken. The remedial action includes removing the spoofed data associated with the spoofed satellite that was input to the GNSS receiver 110 during epochs $e_1$-$e_n$, from the calculation of the vehicle state by the navigation system in the vehicle 50. The flow of method 800 then proceeds from block 806 to block 808 until the flow proceeds to 802.

When the differences between the first-curve parameters and the second-curve parameters do not exceed a selected-curve-fit threshold for any of the satellites in view of the GNSS receiver 110, the flow of method 800 proceeds from block 812 to block 814.

At block 814 it is determined if a new set of first-curve parameters and second-curve parameters have been input to the curve-fit-detection logic 240. If a new set of first-curve parameters and second-curve parameters have not been input to the curve-fit-detection logic 240, the flow continues to loop back to block 808 until the flow proceeds to 802. If it is determined at block 814 that a new set of first-curve parameters and second-curve parameters have been input to the curve-fit-detection logic 240, the flow of method 814 proceeds back to block 810.

In this manner, system 12 periodically determines, for each of the plurality of satellites 351-353, if differences between a corrected-delta-carrier-phase range and a predicted delta range indicate input at a GNSS receiver 110 in a last epoch is spoofed and simultaneously determines if differences between first-curve parameters associated with a first curve and second-curve parameters associated with a second curve exceed a selected threshold in order to determine the GNSS receiver 110 was spoofed during a sequential plurality of epochs.

The processor includes or functions with software programs, firmware or other computer readable instructions for carrying out various methods, process tasks, calculations, and control functions, used in the system to detect spoofing attacks.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The global navigation satellite systems (GNSS) described herein include Global Positioning System (GPS), GLONASS, BeiDou, EGNOS, Galileo, Indian Regional Navigational Satellite System (IRNSS) and Quasi-Zenith Satellite System (QZSS)) and any other system of global navigation satellites.

Example Embodiments

Example 1 includes a system to detect spoofing attacks, the system comprising: a satellite-motion-and-receiver-clock-correction module communicatively coupled to periodically input, from a global navigation satellite system (GNSS) receiver, a carrier phase range for a plurality of satellites in view of the GNSS receiver, the satellite-motion-and-receiver-clock-correction module communicatively coupled to output a corrected-delta-carrier-phase range for a current epoch to a first input of a subtractor; a compute-predicted-range-and-delta-range module communicatively coupled to output a predicted delta range to a second input of the subtractor, the predicted delta range being based on inertial measurements observed for the current epoch; the subtractor to output a difference between the corrected-delta-carrier-phase range and the predicted delta range for the current epoch to delta-range-difference-detection logic; and the delta-range-difference-detection logic to determine if the difference exceeds a selected-range threshold, wherein, if the difference exceeds the selected-range threshold, the delta-range-difference-detection logic determines the GNSS receiver was spoofed in the current epoch.

Example 2 includes the system of Example 1, further comprising: a first curve-fit module configured to: input, from the satellite-motion-and-receiver-clock-correction module, a plurality of corrected-carrier-phase ranges sequentially obtained during a respective plurality of epochs; fit the sequentially obtained plurality of corrected-carrier-phase ranges to a first curve of a selected appropriate order; and output information indicative of first-curve parameters associated with the first curve to curve-fit-detection logic; a second curve-fit module configured to: input, from the compute-predicted-range-and-delta-range module, a plurality of predicted ranges sequentially obtained during the respective plurality of epochs; fit the sequentially obtained plurality of predicted ranges to a second curve of the selected appropriate order; and output information indicative of second-curve parameters associated with the second curve to the curve-fit-detection logic, the second-curve parameters being same types of parameters as the first-curve parameters; the curve-fit-detection logic configured to: compare the first-curve parameters with the second-curve parameters, wherein, if differences between the first-curve parameters and the second curve parameters exceed a selected-curve-fit threshold, the curve-fit-detection logic determines the GNSS receiver was spoofed during the sequential plurality of epochs.

Example 3 includes the system of Example 2, further including a processor configured to execute algorithms in the satellite-motion-and-receiver-clock-correction module, the compute-predicted-range-and-delta-range module, the first curve-fit module, and the second first curve-fit module.

Example 4 includes the system of any of Examples 1-3, further including a processor configured to execute algorithms in the satellite-motion-and-receiver-clock-correction module and the compute-predicted-range-and-delta-range module.

Example 5 includes the system of any of Examples 1-4, further comprising: the GNSS receiver communicatively coupled to input data from the plurality of satellites in view of the GNSS receiver.

Example 6 includes the system of any of Examples 1-5, further comprising: inertial sensors configured to periodically output inertial measurements to the compute-predicted-range-and-delta-range module.

Example 7 includes the system of Example 6, wherein the inertial sensors include at least one of an accelerometer and a gyroscope.

Example 8 includes a system to detect spoofing attacks, the system comprising: a satellite-motion-and-receiver-clock-correction module communicatively coupled to periodically input, from a global navigation satellite system (GNSS) receiver, a carrier phase range for a plurality of satellites in view of the GNSS receiver, the satellite-motion-and-receiver-clock-correction module communicatively coupled to output corrected-carrier-phase ranges to a first curve-fit module, the first curve-fit module configured to: input, from the satellite-motion-and-receiver-clock-correction module, a plurality of corrected-carrier-phase ranges sequentially obtained during a respective plurality of epochs; fit the sequentially obtained plurality of corrected-carrier-phase ranges to a first curve of a selected appropriate order; and output information indicative of first-curve parameters associated with the first curve to curve-fit-detection logic; a compute-predicted-range-and-delta-range module communicatively coupled to output predicted ranges to the plurality of satellites to a second curve-fit module, the predicted ranges being based on observed inertial measurements; the second curve-fit module configured to: input, from the compute-predicted-range-and-delta-range module, a plurality of predicted ranges sequentially obtained during the respective plurality of epochs; fit the sequentially obtained plurality of predicted ranges to a second curve of the selected appropriate order; and output information indicative of second-curve parameters associated with the second curve to the curve-fit-detection logic, the second-curve parameters being same types of parameters as the first-curve parameters; and the curve-fit-detection logic configured to compare the first-curve parameters with the second-curve parameters, wherein, if differences between the first-curve parameters and the second-curve parameters exceed a selected-curve-fit threshold, the curve-fit-detection logic determines the GNSS receiver was spoofed during the sequential plurality of epochs.

Example 9 includes the system of Example 8, the system further comprising: a subtractor having a first input, a second input, and an output, the first input configured to input a corrected-delta-carrier-phase range satellite-motion-and-receiver-clock-correction module for a current epoch, the second input configure to input a predicted delta range from the compute-predicted-range-and-delta-range module for the current epoch, and the output configured to output a difference between the corrected-delta-carrier-phase range and the predicted delta range for the current epoch; and delta-range-difference-detection logic configured to input the difference and to determine if the difference exceeds a selected-range threshold, wherein, if the difference exceeds the selected-range threshold, the delta-range-difference-detection logic determines the GNSS receiver was spoofed in the current epoch.

Example 10 includes the system of Example 9, further including a processor configured to execute algorithms in the satellite-motion-and-receiver-clock-correction module, the compute-predicted-range-and-delta-range module, the first curve-fit module, and second first curve-fit module.

Example 11 includes the system of any of Examples 8-10, further including a processor configured to execute algorithms in the first curve-fit module and second first curve-fit module.

Example 12 includes the system of any of Examples 8-11, further comprising: the GNSS receiver communicatively coupled to input data from the plurality of satellites in view of the GNSS receiver.

Example 13 includes the system of any of Examples 8-12, further comprising: inertial sensors configured to periodically output inertial measurements to the compute-predicted-range-and-delta-range module.

Example 14 includes a method to prevent spoofing attacks on a global navigation satellite system (GNSS) receiver, the method comprising at least one of: for an epoch of a global navigation satellite system (GNSS) system: providing a difference between a corrected-delta-carrier-phase range and a predicted delta range; and determining the GNSS receiver was spoofed during the epoch when a difference between the corrected-delta-carrier-phase range and the predicted delta range exceeds a selected-range threshold; and for a plurality of sequential epochs of the GNSS system: comparing first-curve parameters associated with a first curve with second-curve parameters associated with a second curve; and determining the GNSS receiver was spoofed during the sequential plurality of epochs when differences between the first-curve parameters and the second-curve parameters exceed a selected-curve-fit threshold.

Example 15 includes the method of Example 14, further comprising: periodically inputting a carrier phase range from the GNSS receiver at a satellite-motion-and-receiver-clock-correction module; and periodically inputting inertial measurements from inertial sensors at a compute-predicted-range-and-delta-range module.

Example 16 includes the method of Example 15, wherein comparing the corrected-delta-carrier-phase range and the predicted delta range for the epoch comprises: inputting the corrected-delta-carrier-phase range to a first input of a subtractor from the satellite-motion-and-receiver-clock-correction module; and inputting the predicted delta range to a second input of the subtractor from the compute-predicted-range-and-delta-range module.

Example 17 includes the method of Example 16, further comprising: outputting the difference between the corrected-delta-carrier-phase range and the predicted delta range for the epoch from the subtractor to delta-range-difference-detection logic, wherein determining the GNSS receiver was spoofed during the epoch comprises: determining the difference exceeds the selected-range threshold.

Example 18 includes the method of any of Examples 15-17, further comprising: fitting corrected-carrier-phase ranges for the plurality of sequential epoch to the first curve of a selected appropriate order; and fitting predicted ranges for the plurality of sequential epoch to the second curve of the selected appropriate order.

Example 19 includes the method of Example 18, further comprising: determining the first-curve parameters based on fitting the corrected-carrier-phase ranges to the first curve; and determining the second-curve parameters based on fitting the predicted ranges to the second curve.

Example 20 includes the method of any of Examples 15-19, further comprising: inputting data from a plurality of satellites at the GNSS receiver.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A non-transitory computer readable medium storing a program causing a computer to execute a process to detect spoofing attacks on a global navigation satellite system (GNSS) receiver, the process comprising:
periodically receiving from the GNSS receiver information indicative of a carrier phase range for a plurality of satellites in view of the GNSS receiver;
receiving a corrected-delta-carrier-phase range for a current epoch from the satellite-motion-and-receiver-clock-correction module;
outputting a predicted delta range being based on inertial measurements observed for the current epoch;
providing a difference between the corrected-delta-carrier-phase range and the predicted delta range for the current epoch; and
determining if the difference exceeds a selected-range threshold, wherein, if the difference exceeds the selected-range threshold, determining that the GNSS receiver was spoofed in the current epoch.

2. The non-transitory computer readable medium of claim 1, wherein the process further comprises:
inputting a plurality of corrected-carrier-phase ranges sequentially obtained during a respective plurality of epochs;
fitting a first curve, determined from corrected-carrier-phase ranges for most or all of the respective epochs, of a selected appropriate order to the sequentially obtained plurality of corrected-carrier-phase ranges;
outputting information indicative of first-curve parameters associated with the first curve;
inputting a plurality of predicted ranges sequentially obtained during the respective plurality of epochs;
fitting a second curve, determined from inertial-based predicted ranges for most or all of the respective plurality of epochs, to the sequentially obtained plurality of predicted ranges;
outputting information indicative of second-curve parameters associated with the second curve, the second-curve parameters being same types of parameters as the first-curve parameters; and
comparing the first-curve parameters with the second-curve parameters, wherein, if differences between the first-curve parameters and the second curve parameters exceed a selected-curve-fit threshold, determining that the GNSS receiver was spoofed during the sequential plurality of epochs.

3. The non-transitory computer readable medium of claim 2, wherein outputting the information indicative of the first-curve parameters associated with the first curve comprises outputting information indicative of first-curve parameters (a, c, d, and f) associated with the first curve;
wherein outputting the information indicative of the second-curve parameters associated with the second curve comprises outputting information indicative of second-curve parameters (b, c, d, and g) associated with the second curve; and
wherein comparing the first-curve parameters with the second-curve parameters comprises comparing the first-curve parameters (a, c, d, and f) with the second-curve parameters (b, c, d, and g).

4. A non-transitory computer readable medium storing a program causing a computer to execute a process to detect spoofing attacks attacks on a global navigation satellite system (GNSS) receiver, the process comprising:
receiving from the GNSS receiver information indicative of a carrier phase range for a plurality of satellites in view of the GNSS receiver;
inputting a plurality of corrected-carrier-phase ranges sequentially obtained during a respective plurality of epochs;
fitting a first curve, determined from corrected-carrier-phase ranges for most or all of the respective epochs, of a selected appropriate order to the sequentially obtained plurality of corrected-carrier-phase;
outputting information indicative of first-curve parameters associated with the first curve;
receiving observed inertial measurements;
inputting a plurality of predicted ranges, based upon the observed inertial measurements, sequentially obtained during the respective plurality of epochs;
fitting a second curve, determined from inertial-based predicted ranges for most or all of the respective plurality of epochs, to the sequentially obtained plurality of predicted ranges;
outputting information indicative of second-curve parameters associated with the second curve, the second-curve parameters being same types of parameters as the first-curve parameters; and
comparing the first-curve parameters with the second-curve parameters,
wherein, if differences between the first-curve parameters and the second-curve parameters exceed a selected-curve-fit threshold, determining that the GNSS receiver was spoofed during the sequential plurality of epochs.

5. The non-transitory computer readable medium of claim 4, the process further comprising:
inputting a corrected-delta-carrier-phase range for a current epoch;
inputting a predicted delta range for the current epoch;
outputting a difference between the corrected-delta-carrier-phase range and the predicted delta range for the current epoch; and
inputting the difference and to determine if the difference exceeds a selected-range threshold, wherein, if the difference exceeds the selected-range threshold, determining that the GNSS receiver was spoofed in the current epoch.

6. The non-transitory computer readable medium of claim 4, wherein outputting the information indicative of the first-curve parameters associated with the first curve comprises outputting information indicative of first-curve parameters (a, c, d, and f) associated with the first curve;
wherein outputting the information indicative of the second-curve parameters associated with the second curve comprises outputting information indicative of second-curve parameters (b, c, d, and g) associated with the second curve; and
wherein comparing the first-curve parameters with the second-curve parameters comprises comparing the first-curve parameters (a, c, d, and f) with the second-curve parameters (b, c, d, and g).

7. A method to detect spoofing attacks on a global navigation satellite system (GNSS) receiver, the method comprising:
for a plurality of sequential epochs of a GNSS system received by the GNSS receiver:
comparing first-curve parameters associated with a first curve, determined from corrected-carrier-phase ranges for most or all of the plurality of sequential epochs, with second-curve parameters, determined from inertial-based predicted ranges for most or all of the plurality of sequential epochs associated with a second curve; and determining the GNSS receiver was spoofed during the sequential plurality of epochs when differences between the first-curve parameters and the second-curve parameters exceed a selected-curve-fit threshold.

8. The method of claim 7, further comprising:
periodically inputting a carrier phase range from the GNSS receiver at a satellite-motion-and-receiver-clock-correction module; and
periodically inputting inertial measurements from inertial sensors at a compute-predicted-range-and-delta-range module.

9. The method of claim 8, wherein comparing the corrected-delta-carrier-phase range and the predicted delta range for the epoch comprises:
inputting the corrected-delta-carrier-phase range to a first input of a subtractor from the satellite-motion-and-receiver-clock-correction module; and
inputting the predicted delta range to a second input of the subtractor from the compute-predicted-range-and-delta-range module.

10. The method of claim 9, further comprising:
outputting the difference between the corrected-delta-carrier-phase range and the predicted delta range for the epoch from the subtractor to delta-range-difference-detection logic, wherein determining the GNSS receiver was spoofed during the epoch comprises:
determining the difference exceeds the selected-range threshold.

11. The method of claim 8, further comprising:
fitting the first curve, determined from corrected-carrier-phase ranges for most or all of the plurality of sequential epochs, of a selected appropriate order to corrected-carrier-phase ranges for the plurality of sequential epochs; and
fitting the second curve, determined from inertial-based predicted ranges for most or all of the plurality of sequential epochs, to predicted ranges for the plurality of sequential epochs.

12. The method of claim 11, further comprising:
determining the first-curve parameters based on fitting the corrected-carrier-phase ranges to the first curve; and
determining the second-curve parameters based on fitting the predicted ranges to the second curve.

13. The method of claim 8, further comprising:
inputting data from a plurality of satellites at the GNSS receiver.

* * * * *

UNITED STATES PATENT AND TRADEMARK OFFICE
CERTIFICATE OF CORRECTION

PATENT NO. : 10,094,930 B2  
APPLICATION NO. : 14/747547  
DATED : October 9, 2018  
INVENTOR(S) : Schipper et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 479 days.

Signed and Sealed this
Twenty-third Day of April, 2019

Andrei Iancu
*Director of the United States Patent and Trademark Office*